UNITED STATES PATENT OFFICE.

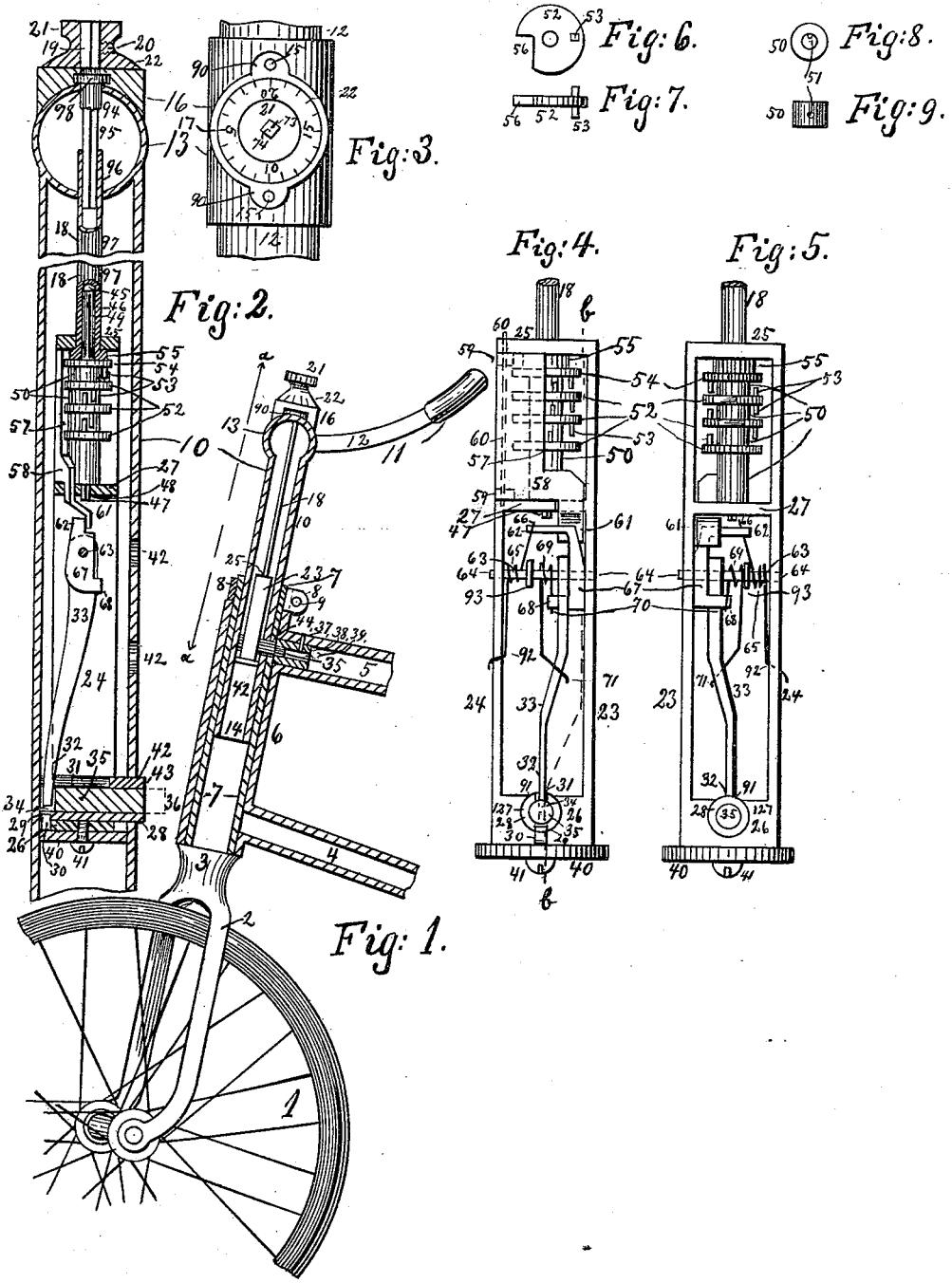

SAMUEL C. HONE, OF ST. PAUL, MINNESOTA.

BICYCLE-LOCK.

SPECIFICATION forming part of Letters Patent No. 525,953, dated September 11, 1894.

Application filed March 31, 1894. Serial No. 505,870. (No model.)

*To all whom it may concern:*

Be it known that I, SAMUEL C. HONE, a citizen of the United States, residing at St. Paul, in the county of Ramsey and State of Minnesota, have invented certain new and useful Improvements in Bicycle-Locks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in locks for bicycles and tricycles.

The objects of my invention are, first, to provide a bicycle lock of which the locking parts cannot be reached and picked or destroyed by a thief wishing to steal and run away with the bicycle; second, to provide a bicycle lock that cannot be opened by a false key or by any person not knowing the combination of the lock; third, to provide a bicycle with a permutation lock, the combination of which may be readily changed from the outside without opening the lock; fourth, to provide a bicycle lock that will prevent steering of the bicycle and thereby render it unfit to ride; and fifth, to provide a bicycle lock that will take up very little space, look neat and be convenient and handy to use. I attain these objects by the novel construction and combination of parts illustrated in the accompanying drawings, in which—

Figure 1, is a central sectional side elevation of the front portion of a bicycle showing my locking device as applied inside the frame. The handles, front wheel and fork embracing the latter are turned slightly to the left and are not in section. Neither is the knob of the lock on the top of the machine in section. Fig. 2, is an enlarged sectional side view about the same as between *a*, and *a*, in Fig. 1, leaving out all of the frame and the handles and with the lock knob in section, and the lock itself in section, as on the line *b*, *b*, in Fig. 4. Fig. 3, is a top view of the knob of the lock and the top end of the handle tube with a portion of the handle bar secured in it. Fig. 4, is a front view and Fig. 5, is a rear view of the lock removed from the bicycle frame and with its knob cut away. Fig. 6, is a plan view, and Fig. 7, is an edge view of the disks I use in my locks. Fig. 8, is an end view, and Fig. 9, a side view of the non-turning tubes I use between the disks.

Referring to the drawings by reference numerals, 1, is the front or steering wheel of the bicycle.

2, is the usual fork in which the steering wheel is journaled. This fork is provided with an annular shoulder 3, upon which the front end of the tubular bicycle frame 4, 5, 6, is supported.

7, is a tubular extension or shank extending from the fork 2, up through the hollow frame portion 6, in which it is retained by a clamp collar 8, and screw 9, which clamp collar also serves to hold the handle tube 10, in the desired elevation in the steering tube 7, which for that purpose is provided with a slit (not shown), so that it may be clamped firmly by the collar 8, around and turn with the handle tube 10.

11, are the handles of the bicycle. These are provided upon both ends of the handle bar 12, which is secured in the upper end portion 13, of the handle tube 10.

The piece 13, or the T-shaped junction of the handle tube and the handle bar, I will term "the head of the handle tube" (as it is not always constructed as herein shown).

14, is the bottom end of the handle tube 10, which, as stated, may be adjusted up and down in the fork shank or steering tube 7.

Upon the top of the head piece 13, of the handle tube I secure by two screw rivets 15, the lugs 90, of a seat piece 16, having a radial mark 17, and a central hole in which is journaled a spindle rod 18, with a four cornered top end 19, upon which is fitted and by a set-screw 20, retained the locking knob 21, having the graduated disk or dial 22.

The lower end of the spindle rod or spindle 18, passes down into the frame of the lock proper, which will now be described. The frame or case of the lock consists of the side bars 23, and 24, the top cross bar 25, the bottom cross bar 26, and the intermediate cross bar 27. In the middle of the bottom bar 26, I drill a hole 127, open at its upper side as at 91. In this hole I fit very snugly the tube 28, which in the front end of its bottom side is provided with a notch 29, in which fits the rigid lug 30, of the bottom bar 26, and keeps the tube 28, from turning and from sliding too far forward. In the front of the upper side of the tube 28, I provide another and longer notch or slot 31, in which moves the lower end 32, of the lever 33, (presently to be more fully described,) and engages the slotted hole 34, of the locking bar 35, which slides in the tube 28, and by means of the lever 33, may be retracted into the tube 28, or caused to project out as shown in the dotted lines 36, in Fig. 2, in which position its end will enter into the front end of the hollow frame bar 5, of the bicycle frame, and thus prevent the rocking motion of the fork 2, and fork shank or steering tube 7, by which the steering is done.

Where the opening in the tube 5, is too large for the locking bar 35, to fit it, I secure in it by a pin 37, a bushing 38, which has a central hole 39, fitting the locking bar.

40, is a round disk cast upon or secured to the bottom bar 26, by a rivet or screw 41, and serves to guidingly fill the handle tube 10, thereby holding the lock in the center of it. The tube 28, projects out through one of the holes 42, in the side of the tube 10, and engages with its outer end 43, a hole 44, in the steering tube 7, so that the said two tubes are by means of the outer portion of the transverse tube 28, locked together.

When it is desired to raise or lower the handle tube 10, the frame portion 6, is moved upward out of the way, the tube 28, extracted and the handle tube 10, moved so that the desired one of the holes 42, will register with the hole 44, in the tube 7, with the tubes 7 and 10 in a horizontal position. The lock is moved and turned into position by a narrow screwdriver or any other suitable narrow tool, inserted through the registering holes 42 and 44, and the tube 28, is then again pressed into its place, where it will be retained by the frame tube 6, and bushing 38, which will always cover more or less of the outer end of it. Such raising and lowering of the handles requires a corresponding shortening and lengthening of the spindle rod 18, which I therefore make with a sliding joint as shown in Fig. 2, where it will be observed that the rod 18, is made in two sections 94, and 97, of which the upper section 94, has a four-cornered bottom portion 95, slidingly inserted in the internally square top end 96, of the lower section 97, so that the upper section may slide in the lower one.

The lower end of the spindle rod 18, is hollow as shown at 45, in the cut-away in Fig. 2, and in said opening is journaled the upper end of a stationary bar, or standard 46, having its four-cornered bottom end 47, inserted in a square hole 48, in the cross frame bar 27. Upon the standard 46, which is provided with a longitudinal groove or keyway 49, in one side, I place the tubes 50, with their inwardly projecting pin or keys 51 guiding in the key way 49, and between said tubes or rings 50, I interpose the revoluble disks 52, having the pegs 53, by which to interlock and turn each other. 54, is a disk having a hub 55, which is rigidly secured upon the hollow end of the bar 18, close below the top frame bar 25, of the lock. Each one of said disks 50, and 54, is provided with a large notch 56 (of the shape shown in Fig. 6) which, when the lock is opened, are all in a line and register with and receive the swinging edge 57, of the fan or leaf-like plate 58, swinging on pivot joints formed by the lugs 59, of the lid and the wire 60, passed through said lugs and through the frame bars 25, and 27, (as best shown in Fig. 2.) The lower end of the leaf 58, is provided with an offset arm 61, which engages the short and angularly bent end 62, of the lever 33, which is fulcrumed on the round transverse supporting bar 63, secured with both ends 64, in the side bars 23, and 24, of the frame of the lock.

65, is a wire spring taken a few coils around the bar 63, and engages with its upper end 66, the arm or bent end 61, of the lever 33, and with its lower end 92, the frame bar 24 in such a manner that the leaf 58, is by the said spring held into the notches 56, of the disks 50, and the locking bolt 35, stands retracted into its tube 28, and the bicycle is unlocked and ready for use.

The lever 33, is made in two sections or pieces 33, and 67, both fulcrumed side by side upon the supporting bar 63. The piece 67, has besides the transverse arm 61, already described, another transverse arm 68, which passes transversely over the section 33, and is spring-held against it by the wire spring 69, which is taken a few coils around the bar 63, and has its two ends 70, and 71, engaging the arm 68, and lever section 33, respectively, holding them toward each other so as to form of the two sections one lever 33, 67, with a safety spring joint in it, the purpose of which is to guard against breaking of the lever but more especially to facilitate a speedy locking and unlocking as will fully appear from the following description of the operation.

To lock the bicycle all that the operator has to do is to give a slight turn to the knob 21, as that will throw one or more of the disks 52, with the widest portion or periphery against the fan 58, which will thereby swing, and by pressing its arm 61, against the arm 62, swings the arm 68, away from the lever section 33, thus leaving the spring arm 71, ready to throw the locking bar 35, into its hole in the bicycle frame as soon as either a thief tries to use the bicycle or the owner will take the trouble to turn the steering tube until the locking hole registers with the locking bar. In like manner when the unlocking is to take place, the operator needs only to turn the knob 21, according to a predetermined combination on which the lock is set, so that the notches 56, in all the disks register with the edge 57, of the leaf or fan 58, and the spring arm 65, acting on the lever arm 62, will retract into the lock the locking bar 35, as soon as the hole in the frame registers with the hole in the tube 28. Were it not for the safety joint in the lever 33, 67, it would become necessary to turn the handles till the tube 28, housing the locking bar 35, came exactly in front of the locking hole in the bicycle frame, or in the bushing 38, before the knob of the lock could be free to turn, which operation might take much time as the parts to register are inclosed from view.

The lock may be made with more or less of the disks 52, and the knob disk or dial 22, may have any desired and convenient number of graduation marks. In the present instance, which gives an idea of the general way I arrange the combination, I use four of the locking disks 52, and I provide the dial 22, with twenty graduation marks, of which some are numbered 5, 10, 15, and 20, (and where I use more marks I double the number to forty.)

73, is the "factory mark" on the knob. This mark must register with the mark 74, on the spindle bar in order to open the lock by the combination given by the factory or maker of the locks. Such combinations given by the maker may start from any one of the twenty, or forty marks on the dial and thus make forty different combinations, and by starting in opposite directions eighty combinations are obtained, which may at any time be changed by the users of the locks into three additional combinations by loosening the screw 20, lifting off the knob 21, from the spindle bar 18, and replace it after giving it one- or two- or three-fourths of a turn, thereby changing the starting number of the combination one- or two- or three-fourths of the dial. For example: In the present dial with twenty marks if the original or factory combination is 5—10—15—20 then one-fourth of a turn of the knob upon its square spindle bar will change the combination to 10—15—20—5, and half a turn would make it 15—20—5—10, and if the original combination were 3—8—13—18, then one-fourth of a turn would make it 8—13—18—3, and so on, from any number in twenty or forty or any other number divisible by four which may be used. Thus by using twenty graduation marks eighty different combinations may be obtained, which by starting them in opposite directions will amount to one hundred and sixty, and by using a dial with forty marks from one hundred and sixty to three hundred and twenty different combinations may be obtained.

93, is a washer separating the springs 65, and 69.

98, is a thin collar secured upon the spindle rod 18, in a cavity in the under side of the seat piece 16. It serves to keep the spindle section 94, and knob 21, in place and from rattling up and down when the bicycle moves.

The locking hole in the tube 7, may be to one side, so as to lock the front wheel in a diagonal position relative to the hind wheel but I do not wish to confine myself to any exact location of the holes in which the locking bar engages as it is obvious that the locking of the steering tube to the frame of the bicycle may be accomplished from different points, and with the steering wheel in different positions.

Having thus described my invention, what I claim, and desire to secure by Letters Patent, is—

1. The bicycle lock having an elongated frame adapted to go into the steering tube or handle tube of the bicycle, the transversely arranged locking bolt or bar 35, sliding in a channel or tube in the end of the frame and projecting, in its locked position, with its free end beyond the frame of the lock where it engages a hole in the steering tube and a registering hole in the frame of the bicycle, said locking bar 35 having a slotted hole as 34, the lever 33, 67, pivoted in the frame of the lock and engaging with one end in the slot of the locking bar and having its other end actuated in one direction by a swinging, fan-shaped lever, as 58, and revolving cams or notched disks as 52, and in the other direction by a spring, said disks having interlocking pegs as 53, and intermediate non-turning tubes, as 50, all arranged upon a standard, as 46, and operated by a disk, as 55, having a rod or spindle as 18, extending to the outside of the machine, a graduated dial and operating knob secured upon the exterior end of said spindle bar 18, a mark upon the seat of said dial, by which to turn the dial according to a predetermined combination or arrangement of the disks 55 and 53, relatively to each other and to the fan-lever 58, so as to push the locking bar forward, or allow it to be retracted into the frame of the lock, substantially as shown and described and for the purpose set forth.

2. In a bicycle, the combination of the hollow frame bar 6, having in one of its sides a locking hole or aperture normally concealed from external view, and reach, the steering-wheel 1, having the steering-fork 2, and the steering tube 7, extending through the hollow frame bar 6, and having the side hole 44, registering with the said locking hole in the frame, the handle tube 10, carrying the handle bar 12, and handles 11, and on its head 13, the seat piece 16, and operating knob 21, having a graduated dial as 22, the said handle tube 10, having a series of holes as 42, adapted to register alternately with the hole 44, in the steering tube, according to the height the handle tube is set in, the transverse tube 28, adapted to normally extend through the hole 44, and one of the holes 42, so as to lock the steering tube and the handle tube together, the locking bar 35, sliding in the tube 28, and engaging the locking hole in the frame bar 6, a swinging lever or arm engaging and operating the locking bar, a suitable locking mechanism located inside the handle tube 10, operating the said lever or arm, and having an extensible operating rod, as 18, connecting the locking mechanism with the operating knob 21, upon the head of the handle tube, said operating rod 18, having the retaining collar 98, all substantially as shown and described and for the purpose set forth.

3. A lock for bicycles and tricycles adapted to be inserted into the handle tube or steering tube of the machine, and having a sliding locking bolt, pin or bar with a side hole or notch and being adapted to engage holes in the sides of the steering tube or handle tube or both, and a hole, aperture or hollow in the inner side of the frame portion through which the steering or handle tube passes: the lock frame 23, 24, 25, 26, 27, having the round supporting bar 63, the guiding disk 40, the open-sided hole 27, and the lug 30, the tube 28, housing the locking bar and being snugly inserted in the hole 27, and having the notch 29, guiding on the lug or pin 30, and the upper and deep notch or slot 31, the two-part lever 33, 67, fulcrumed on the round bar or pin 63, and having one end engaging the hole in the locking bolt and the other end engaging an arm as 61, of a swinging fan as 58, pivoted or hinged as at 59, 60, in the frame of the lock, a series of revoluble interlocking disks arranged centrally upon a standard and having notches substantially as 56, for receiving the swinging edge 57, of the fan 58, or by their circular periphery repeal said fan; one of said disks having secured to it an operating rod as 18, having the four cornered end 19, extending above the head of the handle tube, the seat piece 16, having the mark 17, the operating knob 21, having the graduated dial 22, and a square hole in the center fitting the four cornered end of the operating rod and being changeable in four distinct directions upon the rod, the marks 73, and 74, the collar 98, and the set screw 20, for adjustably securing the knob 21; said two-part lever 33, 67, having the stop joint arm 68, stopping against the lever section 33, and the springs 65, and 69, all arranged and located, substantially as shown and described and for the purpose specified.

In testimony whereof I affix my signature in presence of two witnesses.

SAMUEL C. HONE.

Witnesses:
CHAS. W. ALLEN,
J. P. ALLEN.